United States Patent [19]

Baumann

[11] Patent Number: 4,549,623

[45] Date of Patent: Oct. 29, 1985

[54] APPARATUS FOR AUTOMATICALLY MONITORING A CONSTANT CURRENT SOURCE IN A MEASURING INSTRUMENT

[75] Inventor: Arthur Baumann, Bertschikon, Switzerland

[73] Assignee: Mettler Instrumente AG, Greifensee, Switzerland

[21] Appl. No.: 639,627

[22] Filed: Aug. 13, 1984

[30] Foreign Application Priority Data

Sep. 29, 1983 [CH] Switzerland ............... 5275/83

[51] Int. Cl.⁴ ................. G01G 7/00; G01L 1/08
[52] U.S. Cl. .................. 177/212; 73/862.61; 177/210 EM
[58] Field of Search .......... 177/210 EM, 212; 73/862.61, 862.68

[56] References Cited

U.S. PATENT DOCUMENTS

| | | | |
|---|---|---|---|
| 3,786,678 | 1/1974 | Kunz | 177/212 X |
| 3,786,884 | 1/1974 | Allenspach | 177/212 X |
| 4,159,747 | 7/1979 | Realini | 177/212 X |
| 4,189,017 | 2/1980 | Strobel et al. | 177/212 |
| 4,245,711 | 1/1981 | Kunz | 177/212 |

FOREIGN PATENT DOCUMENTS 1456560 11/1976 United Kingdom ............ 73/862.61

Primary Examiner—George H. Miller, Jr.
Attorney, Agent, or Firm—Erwin S. Teltscher

[57] ABSTRACT

An automatic monitoring system for the constant current source in a balance having electromagnetic load compensation includes circuitry which generates a first current varying in dependence on the constant current and furnishes a digital signal indicative of the value of that current. A microcomputer is provided to compare the digital value to a reference value. If the comparison indicates that the constant current is outside of a given range of values, the microcomputer energizes the display to indicate the presence of an error.

11 Claims, 5 Drawing Figures

Box 42

APPARATUS FOR AUTOMATICALLY MONITORING A CONSTANT CURRENT SOURCE IN A MEASURING INSTRUMENT

CROSS REFERENCE TO RELATED APPLICATIONS AND PUBLICATIONS

1. U.S. Pat. No. 4,245,711.

This publication is hereby incorporated by reference into the present application.

FIELD OF THE INVENTION

The present invention relates to measuring instruments with electromagnetic load compensation. These instruments include a constant current source for energizing a compensation coil arrangement which moves in a permanent magnet system.

BACKGROUND OF THE INVENTION

Measuring instruments with electromagnetic load compensation include, for example, balances operating on the pulse compensation principle, that is balances in which the compensation coil receives pulses for a time interval which depends on the load on the balance, or balances which operate in accordance with a charge balancing principle.

It is particularly important in this type of measuring instrument to detect malfunctions which falsify the measured result, without actually interrupting the operation of the instrument. It is thus necessary to monitor the constant current source (operating constant current source) or the corresponding reference voltage source and reference resistance. In conventional measuring instruments, a second constant current source (test constant current source) or a second reference voltage source were supplied. At a given time, the operator would then switch from the operating constant current source to the test constant current source and check whether the results using the two sources were within a given tolerance.

For this purpose the operating and test voltages or currents had to be exactly equal. This requires a considerable outlay which must, in addition, be repeated several times during the life of the instrument if the long term stability of the two sources is not the same. Also, since switching from the operating to the test voltage or current source had to be initiated by the operator, changes in the former could pass unnoticed over long time periods.

SUMMARY OF THE INVENTION

It is an object of the present invention to furnish a measuring instrument of the above-described type in which the constant current source is monitored continuously and in which the need for the exact matching of the test to the operating voltage source is eliminated.

In accordance with the invention, the constant current source furnishing load-compensating current to a compensating coil is monitored continuously and an error signal is generated when the constant current has a value outside a predetermined range of values.

Specifically, a first current varying in dependence on the constant current and a first digital signal indicative of the value of the first current are furnished. A reference signal is furnished and the first digital signal is compared thereto. An error signal is furnished when this comparison is indicative of a value of the constant current outside of the predetermined range of values.

In a preferred embodiment, the first current is created by a test constant current source and a switch for connecting the test constant current source to the operating constant current source when closed, thereby creating a difference current constituting the first current. Timing means are provided which are responsive to the difference current and open the second switch following a difference current dependent part of each cycle. Further, a sequence of pulses is transmitted from a clock during the difference current dependent part of the cycle. The pulses are counted, and the counts are summed over several cycles. The resultant digital signal is compared to a reference signal in a microcomputer. If the comparison indicates that the constant current is outside the predetermined range, the display is energized to indicate "error", with, possibly, a coded indication of the source of the error.

In this embodiment, the two constant current sources are connected in series across the voltage supply when the switch is closed. In a further preferred embodiment, the test and operating constant current sources are both connected to the same reference potential. A third constant current source furnishes a current proportional to the operating constant current. The switch then alternately connects and disconnects the third constant current source to the test constant current source. The remainder of the circuit operates as did the first embodiment. The advantage of this embodiment is that a lower supply voltage may be used.

The novel features which are considered as characteristic for the invention are set forth in particular in the appended claims. The invention itself, however, both as to its constuction and its method of operation, together with additional objects and advantages thereof will best be understood from the following description of specific embodiments when read in connection with the accompanying drawing.

DESCRIPTION OF THE PREFERRED EMBODIMENTS

Figure 1:
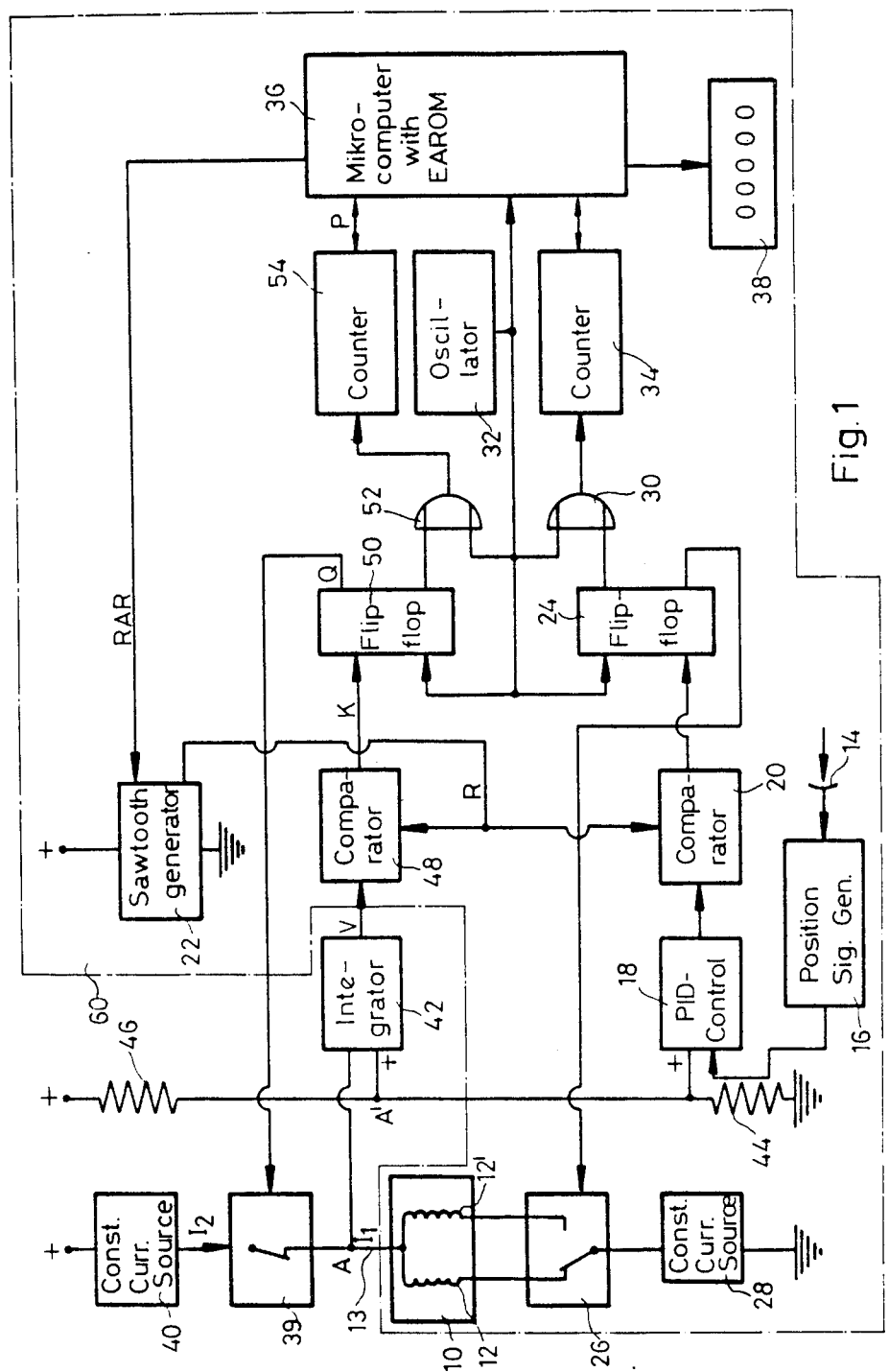
FIG. 1 is a schematic block diagram of a first embodiment of the present invention.

The preferred embodiment will be illustrated in relation to a balance having load pulse compensation as described, for example, in U.S. Pat. No. 4,245,711. The operation of that balance will be described here briefly. Since the balance is conventional in most respects, only the compensation coil package, including coils 12 and 12$^1$ having a tap 13 is illustrated in FIG. 1. A position sensor 14 associated with the load receiver of the balance furnishes a signal which is processed in a position signal generator 16 and then applied to a PID contoller 18. The control signal at the output of controller 18 is applied to one input of a comparator 20 in which it is compared to a periodic sawtooth voltage R generated in a sawtooth generator 22. The time at which the control signal is equal to the sawtooth voltage depends on the load being weighed. The output of comparator 20 is connected to the input of a clock controlled flip-flop 24. The output of the flip-flop in turn operates a switch 26 (first switch means) which alternately connects a constant current source 28 to the ends of coils 12 and $12^1$ respectively. Flip-flop 24 also controls a gate 30 whose other input receives clock signals from a clock signal generator 32. During load-dependent intervals, flip-flop 24 on the one hand causes switch 26 to connect constant current source 28 to coil end 12 and, on the other hand, causes clock pulses to be counted by counter 34. The signal on the counter after several such intervals is thus indicative of the load on the balance. The signals are applied to microcomputer 36 which energizes display 38 to display the weight on the balance.

The above operation is that of the balance described in the above named U.S. patent. The additional circuitry required for monitoring constant current source 28 will be described below.

Figure 4:
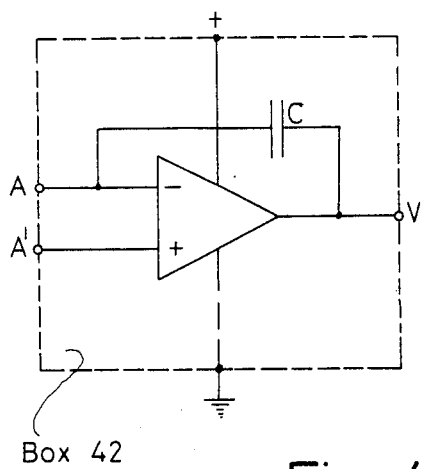
FIG. 4 is more detailed schematic digram of the integrator of FIG. 1.

To allow continuous monitoring of the constant current source during operation, the supply voltage for the source is not derived directly from the positive side of the supply voltage, but rather from a voltage stabilized point A. The voltage at point A is stabilized by use of a voltage divider including resistors 44 and 46 having a voltage tap $A^1$ connected to the positive input of an integrator 42. Integrator 42 is shown in greater detail in FIG. 4. It consists of an operational amplifier having a feedback capacitor C connected from its output to its inverting input. Point A is connected to the inverting input, while point $A^1$ is connected to the direct input of the operational amplifier.

Point A is also connected on the one hand to tap 13 of coils 12, $12^1$ and, on the other hand, to a switch 39 which, when closed, connects point A to the test constant current source 40. The output V of integrator 42 is connected to one input of a comparator 48 whose other input receives the sawtooth from sawtooth voltage generator 22. The comparator output signal furnished by comparator 48 is applied to one input of a clock controlled flip-flop 50. The Q output of flip-flop 50 is connected to the control input of switch 39, while the $\overline{Q}$ output is connected to the inverting input of an OR gate 52. The second input of OR gate 52 receives clock signals from clock signal generator 32. The output pulses of OR gate 52 are applied to a counter 54. The output signal P of counter 54 represents the number of pulses counted during each of a predetermined number of cycles of operation of the equipment. The counting signal P is applied to microcomputer 36 which, in turn, energizes digital display 38 to indicate an error as will be discussed below.

Figure 5:
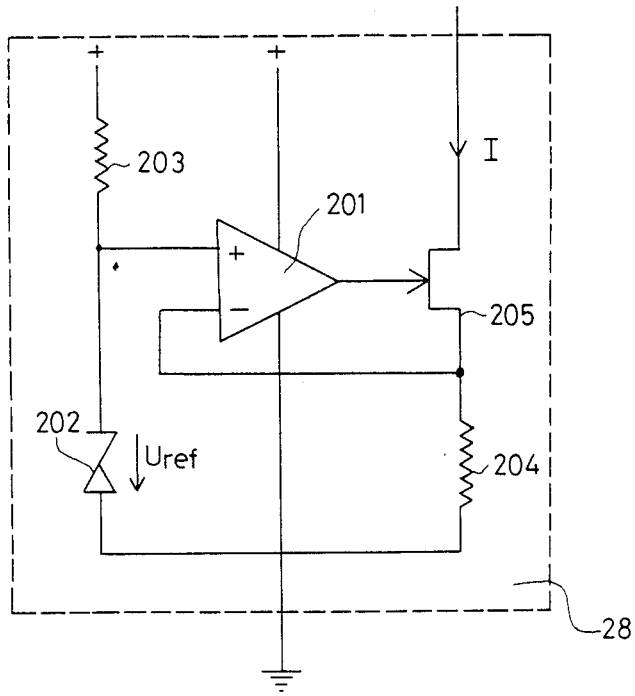
FIG. 5 is a more detailed circuit diagram of the constant current source of FIG. 1.

Constant current source 28 illustrated in FIG. 5 consists of an operational amplifier 201, a Zener diode 202 furnishing a reference voltage to the direct input of amplifier 201, a resistor 203 connected between the positive side of the supply and the direct input of operational amplifier 201 and a resistor 204. Resistor 204 has one end connected to the grounded end of Zener diode 202 and another end connected to the inverting input of operational amplifier 201 and to the source of a field effect transistor 205 constituting a controlled resistance element. In operation, a change in current I changes the voltage drop across resistor 204. This in turn changes the output voltage of operational amplifier 201 in a direction effecting a change in the resistance of the source-drain circuit of element 205 to counteract the change in current.

The apparatus embodying the present invention operates as follows: When switch 39 is open, current $I_1$ flows from point A through one of coils 12 or $12^1$ and through the above-described constant current source 28. Current $I_1$ is integrated by integrator 42 and the output voltage V of integrator 42 rises. Comparator 48 compares the increasing voltage V to sawtooth voltage R. As long as the comparator output K indicates that the voltage R exceeds the voltage V, the Q output of flip-flop 50 remains low and switch 39 remains open.

Figure 2:
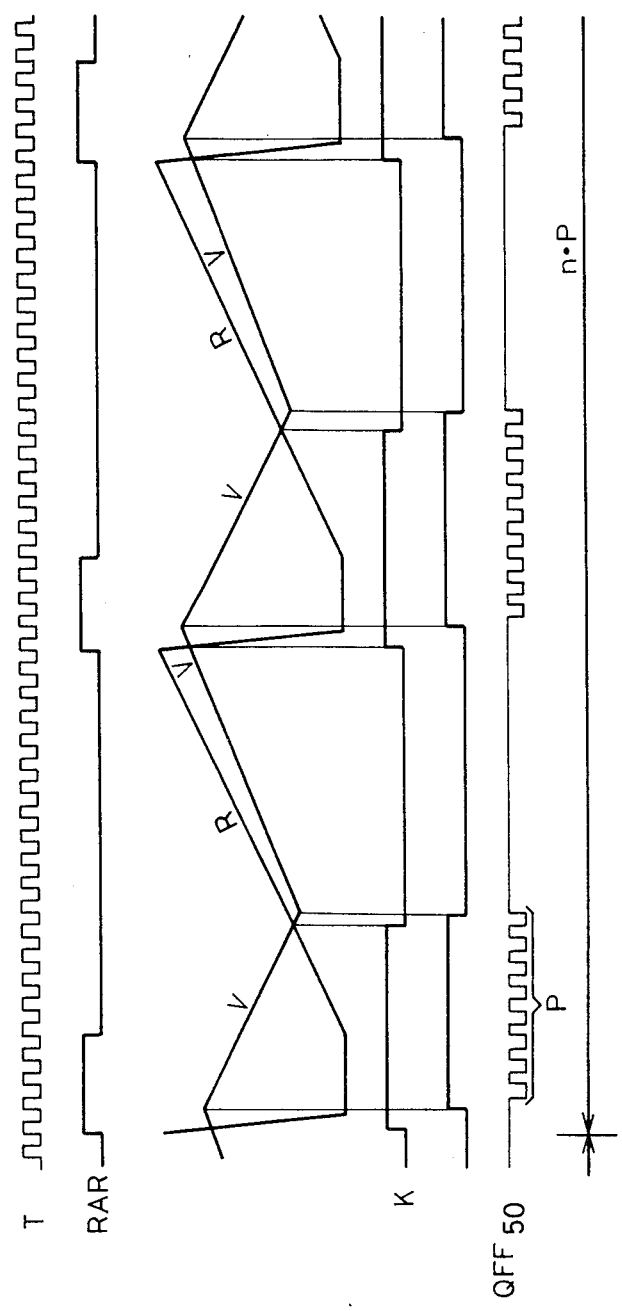
FIG. 2 illustrates the waveforms through several cycles of the equipment of FIG. 1.

When sawtooth generator 22 is reset by a signal from microcomputer 36, the voltage R decreases as illustrated in FIG. 2, and very rapidly becomes less than the voltage V. Output K of comparator 48 switches to high, causing the Q output to become high when the next clock signal is received. This closes switch 39. The inverting input of integrator 42 now receives a difference current $I_2-I_1$, causing the voltage V to decrease. As long as voltage V remains higher than voltage R, switch 39 remains closed and clock pulses pass through gate 52 to counter 54. Microcomputer 36 controls counter 54 so that the counts per cycle (sawtooth period) are summed over a predetermined number of "cycles". The count on counter 54 is then taken over by microcomputer 36 and compared to a reference value. If the difference exceeds a predetermined difference, microcomputer 36 causes display 38 to display the legend "error". The reference value may be stored in microcomputer 36 in, for example, an EAROM. Programming of microcomputer 36 to carry out the above described functions is evident to one skilled in the art and will therefore not be described in detail here. It should be noted that the error display in digital display 38 can also carry some code indication of the error source.

The waveforms at different parts of the apparatus in FIG. 1 are shown in FIG. 2. Specifically, T is the pulse train generated by clock oscillator 32. RAR indicates the reset and start signal for sawtooth generator 22. K shows the variations of the output signal of comparator 48, while Q FF 50 is the synchronized control signal for switch 39. P indicates the number of clock pulses counted per cycle, i.e. per period of the sawtooth generator, while n.P signifies the summation of these clock pulses over n cycles. The curves V and R respectively indicate the wave forms of output voltage V of integrator 24 and sawtooth voltage R of sawtooth generator 22.

Figure 3:
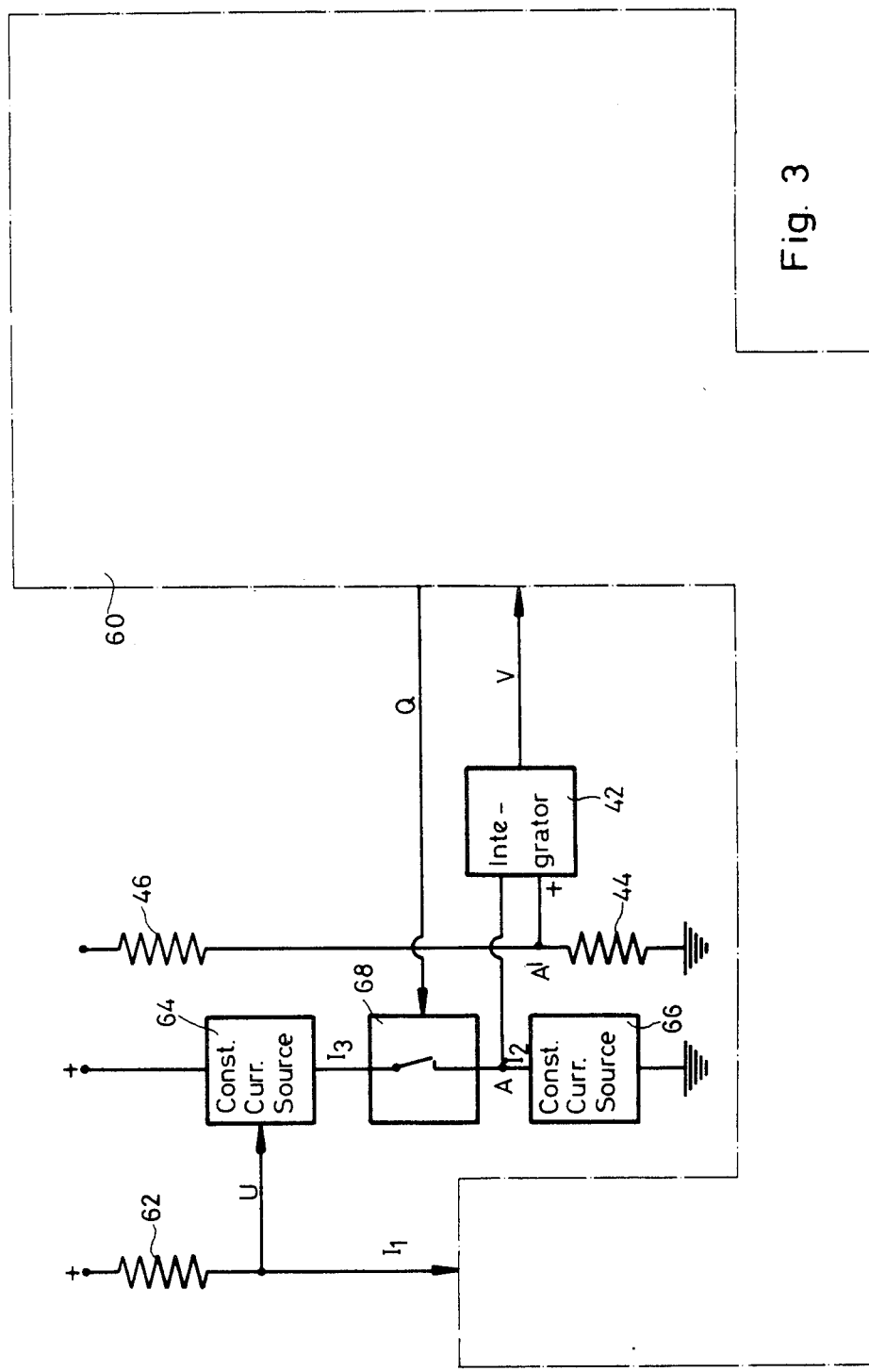
FIG. 3 is a schematic diagram of a second embodiment of the present invention.

The second embodiment of the present invention is illustrated in FIG. 3.

This circuit corresponds substantially to that illustrated in FIG. 1. To simplify matters, the parts of FIG. 3 which are identical to those of FIG. 1 are indicated by a region 60 enclosed by a dashed line. Region 60 is left blank in FIG. 3.

In FIG. 3, a resistor 62 is connected between the positive side of the supply and the compensating coils. Current $I_1$ flowing through a resistor 62 causes a voltage drop U. The voltage U is used as the control voltage for an auxilliary constant current source 64. The current $I_3$ flowing through constant current source 64 is therefore proportional to $I_1$. A test constant current source 66 furnishes a current $I_2$ which is smaller than $I_3$. Constant current source 66 is connectable to constant current source 64 through a switch 68. The common point, A, of switch 68 and constant current source 66 is connected to an integrator 42. Integrator 42 also maintains the voltage at point A substantially equal to that of point A¹ as it did in FIG. 1.

The operation of this circuit is as follows: When switch 68 is closed, difference current $I_3-I_2$ is applied to integrator 42. The output signal, V, of integrator 42 is compared to the sawtooth signal R as in FIG. 1, and switch 68 is opened when voltage R exceeds to voltage V. Thereafter, integrator 42 furnishes current $I_1$ to the operational constant current source.

The advantage of the circuitry in FIG. 3 relative to that of FIG. 1 is that a supply voltage less by several volts suffices. This is because the operating constant current source and the test constant current source now operate with respect to the same reference potential (here ground). Very little additional equipment is required for auxilliary constant current source 64.

The monitoring apparatus of the present invention which operates in accordance with a charge balancing principle, is not limited to balances with pulse compensation as illustrated in the preferred embodiments. It can be used whereever a constant current source must be monitored.

Further, the digitalization of the signals can be accomplished by other methods, for example the well known dual slope method.

It should also be noted that the illustrated compensation coil arrangement, namely one having a tap, is also only one example. The present invention is equally applicable to compensation systems utilizing a single coil and a dummy load for maintaining the constant current in those parts of the cycle in which the coil is not energized. Such a system is disclosed, for example, in U.S. Pat. No. 3,786,678.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. In a measuring instrument having electromagnetic load compensation means comprising compensation coil means and means for furnishing a constant current to said compensation coil means:
    apparatus for automatically generating an error signal when said constant current has a value outside a predetermined range of values, comprising
    first means for generating a first current varying in dependence on said constant current and furnishing a first digital signal indicative of the value thereof; and
    second means connected to said first means for furnishing a reference signal, for comparing said first digital signal to said reference signal, and for furnishing said error signal when said comparison is indicative of a value of said constant current outside said predetermined range of values.

2. Apparatus as set forth in claim 1, wherein said measuring instrument operates in sequential cycles;
    wherein said means for furnishing a constant current to said compensation coil means comprises an operating constant current source, and said first means comprises a test constant current source, and switch means for connecting said test constant current source to said operating constant current source when closed, thereby creating a difference current constituting said first current.

3. Apparatus as set forth in claim 2, wherein said measuring instrument further comprises means for furnishing clock signals;
    and wherein said first means further comprises timing means connected to said clock signal furnishing means and said switch means and responsive to said difference current for closing said switch means for parts of said cycles varying in dependence on said difference current, and for furnishing a sequence of pulses from said clock signal furnishing means only during said difference current-dependent part of said cycles, and counting means connected to said timing means for receiving said sequence of pulses and generating a counting signal corresponding to the number of pulses therein, said counting signal constituting said first digital signal.

4. Apparatus as set forth in claim 3, wherein said second means comprises a microcomputer having a memory means for furnishing said digital reference signal.

5. Apparatus as set forth in claim 4, wherein said measuring instrument further comprises sawtooth signal generating means; and
    wherein said timing means comprises integrator means responsive to said difference signal for furnishing an integrator output signal corresponding thereto, comparator means connected to said integrator means for comparing said integrator output signal to said sawtooth signal and furnishing a comparator output signal indicative of the relative amplitudes thereof, and gating means connected to said comparator means, said counting means and said clock signal furnishing means for gating pulses from said clock signal furnishing means to said counting means under control of said comparator output signal.

6. In a measuring instrument having electromagnetic load compensation means comprising compensation coil means and means for furnishing a constant current to said compensation coil means:
    apparatus for automatically generating an error signal when said constant current has a value outside a predetermined range of values, comprising
    a test constant current source;
    switch means for connecting and disconnecting said test constant current source to said compensation coil means at a predetermined circuit point when in a first or second state, respectively;
    means for maintaining said circuit point at a predetermined voltage independent of said state of said switch means and for generating a current-dependent signal varying in dependence on both said operating constant current and said test constant current;
    and means connected to said voltage maintaining and current-dependent signal generating means for generating said error signal when said current-dependent signal is indicative of a value of said operating constant current outside said predetermined range of values.

7. Apparatus as set forth in claim 6, wherein said voltage maintaining and current dependent signal generating means comprises integrator circuit means.

8. Apparatus as set forth in claim 7, wherein said integrator circuit means comprises means for furnishing a reference voltage, operational amplifier means having a first input connected to said predetermined circuit point, an output furnishing said current dependent signal, and a second input connected to said means for furnishing a reference voltage, and a capacitor connected from said output to said first input.

9. Apparatus as set forth in claim 6, wherein said switch means connects said test constant current source in series with said operating constant current source when in said first state.

10. Apparatus as set forth in claim 6, wherein said switch means connects said test constant current source in parallel to said electromagnetic load compensation means when in said first state; further comprising means for generating a third current proportional to said operating constant current, and means for connecting said third current generating means to said operating constant current source and said switch means.

11. Apparatus as set forth in claim 6, wherein said current-dependent signal varies in dependence on said operating and test constant current sources while said switch means is in said first state and in dependence only on said operating constant current while said switch means is in said second state.

* * * * *